US011143304B2

(12) United States Patent
Deeks

(10) Patent No.: US 11,143,304 B2
(45) Date of Patent: Oct. 12, 2021

(54) METHODS AND APPARATUS FOR SEALING OF METALS

(71) Applicant: Daniel Hiram Deeks, Sea Cliff, NY (US)

(72) Inventor: Daniel Hiram Deeks, Sea Cliff, NY (US)

( * ) Notice: Subject to any disclaimer, the term of this patent is extended or adjusted under 35 U.S.C. 154(b) by 245 days.

(21) Appl. No.: 16/303,743

(22) PCT Filed: May 22, 2017

(86) PCT No.: PCT/US2017/033727
§ 371 (c)(1),
(2) Date: Nov. 21, 2018

(87) PCT Pub. No.: WO2017/205232
PCT Pub. Date: Nov. 30, 2017

(65) Prior Publication Data
US 2020/0318738 A1   Oct. 8, 2020

Related U.S. Application Data

(60) Provisional application No. 62/340,054, filed on May 23, 2016, provisional application No. 62/413,501, filed on Oct. 27, 2016.

(51) Int. Cl.
*F16J 15/08* (2006.01)
*F16J 15/18* (2006.01)
(Continued)

(52) U.S. Cl.
CPC ....... *F16J 15/0806* (2013.01); *F16J 15/0818* (2013.01); *F16J 15/186* (2013.01);
(Continued)

(58) Field of Classification Search
CPC .... F16J 15/0806; F16J 15/0818; F16J 15/186; F16J 15/3212; F16J 2015/0875; H02J 15/00
See application file for complete search history.

(56) References Cited

U.S. PATENT DOCUMENTS 5,113,661 A * 5/1992 Deeks ..................... H02J 15/00
204/155
7,581,403 B2 * 9/2009 Deeks ................... H01M 14/00
205/155

(Continued)

FOREIGN PATENT DOCUMENTS

CN   101978429 A   2/2011
RU   2451246 C2   5/2012

OTHER PUBLICATIONS

International Search Report dated Aug. 31, 2017 issued in PCT/US2017/033727.
(Continued)

*Primary Examiner* — Gilbert Y Lee
(74) *Attorney, Agent, or Firm* — Scully Scott Murphy & Presser

(57) ABSTRACT

Disclosed is a hermetically sealed assembly for precompression of a martinsetic metal for use in negative pressure energy transfer systems, and method of making same. The assembly comprising a martinsetic metal disposed between and in contact with sapphire windows. The assembly has an internal channel to accommodate expansion and contraction of the martinsetic metal. Hermetic sealing means including in different embodiments positive pressure fasteners and a bellows element are used at the periphery of the assembly to enable operation over temperature ranges from ambient to cryogenic without loss of integrity or leakage.

37 Claims, 7 Drawing Sheets

(51) Int. Cl.
 *F16J 15/3212* (2016.01)
 *H02J 15/00* (2006.01)
(52) U.S. Cl.
 CPC .... *F16J 15/3212* (2013.01); *F16J 2015/0875* (2013.01); *H02J 15/00* (2013.01)

(56) References Cited

U.S. PATENT DOCUMENTS

2008/0053833 A1  3/2008  Deeks
2009/0206552 A1  8/2009  Nguy et al.

OTHER PUBLICATIONS

Hori, S. et al., "Plastic workability of pure lithium", Journal of Japan Institute of Light Metals, 2000, pp. 660-665, vol. 50, No. 12.
Deeks, D., "Entropy Driven Absolute Negative Pressure Systems for the Future of Electric Power", International Energy and Sustainability Conference 2014, Date of Conference: Oct. 23-24, 2014, 8 pages, Conference Location: Farmingdale, NY.

* cited by examiner

METHODS AND APPARATUS FOR SEALING OF METALS

This application claims priority under 35 USC § 119 to provisional applications U.S. Ser. No. 62/340,054, filed on May 23, 2016, and U.S. Ser. No. 62/413,501, filed Oct. 27, 2016, the entire contents of each being incorporated herein by reference.

FIELD OF THE DISCLOSURE

The disclosure relates to the hermetic sealing of martensitic metals, such as lithium, in energy storage arrangements, including without limitation, those utilizing negative pressure energy transfer. In one practice, the disclosure relates to the hermetic sealing of sapphire windows between which the martensitic metal is disposed, this assembly being subject to precompression as part of its cryogenic application in the energy storage arrangements aforesaid.

BACKGROUND OF THE DISCLOSURE

In negative pressure energy transfer systems, such as, for example, described in U.S. Pat. Nos. 5,113,661 and 7,581,403, and in Deeks, D. H., "Entropy Driven Absolute Negative Pressure Systems for the Future of Electric Power," IEEE XPlore 2015, the contents of each of which are incorporated herein by reference, which utilize cryogenic temperatures, it is necessary that precompression of martinsetic metals, such as lithium, be in the range of the plastic point. The application of such pressure is time critical to the start of the cryogenic application inasmuch as rupture of the martensitic metal must be avoided. Hermetic sealing using by welding or brazing metal seals to the sapphire to enable this pressurization has proven to be problematic. For example, metals such as molybdenum, or alloys such as KOVAR, which are necessary to match the coefficient of thermal expansion of the sapphire windows can be brazed to each sapphire window.

However, brazing KOVAR directly to each sapphire window followed by welding of these two seals together causes potential deformity in the seals with consequent loss of integrity. Directly brazed and welded molybdenum seals suffer the same problem and are also difficult to machine, and hence not commercially practicable. Moreover, the welding and/or brazing together of these seals requires the thus assembled piece to be annealed while containing the martensitic metal, e.g., lithium, which can cause a chemical reaction with the martensitic metal and the sapphire. There is thus a need for a seal that is hermetic and commercially practice and ameliorates on the aforementioned problem.

SUMMARY OF THE DISCLOSURE

In one embodiment, the disclosure is directed to a hermetically sealed assembly for precompression of a martinsetic metal, the assembly comprising, in combination, a first sapphire window and a second sapphire window, the first and second sapphire windows disposed relative to each other to define a space there between; a martinsetic metal disposed in the space and in contact with the first and second sapphire windows, the first and second sapphire windows configured to define an internal channel around the perimeter of the martinsetic metal, the internal channel extending outwardly from the space and sized to accommodate expansion and contraction of the martinsetic metal within the internal channel; and means for coupling the first and second sapphire windows and hermetically sealing the space and the internal channel.

In one embodiment, the means for coupling and hermetically sealing comprises a gasket interposed between the first and second sapphire windows, the gasket extending around the periphery of the first and second sapphire windows, and a plurality of fasteners, which can comprise positive pressure components, to secure the gasket and the first and second sapphire windows.

In another embodiment, the means for coupling and hermetically sealing comprises a metallic sealing member interposed between the first and second sapphire windows, and extending around the periphery of the first and second sapphire windows. The metallic sealing member can comprise a first and second metallic seals secured respectively to the first and second sapphire windows, and bellows element interposed between the first and second metallic seals. The bellows element can be a metallic ring having a substantially one or more U-shaped cross section(s).

In another embodiment, a method of hermetically sealing an assembly for precompression of a martinsetic metal is disclosed. In one practice, a gasket and peripheral fasteners optionally having positive pressure components is employed. In another embodiment, a bellows element, such as a metallic bellows ring having one or more U-shaped cross section(s) is brazed or welded to metallic seals that are secured to the first and second sapphire windows by brazed or soldered to metalized areas located on the inner periphery of the sapphire windows.

DETAILED DESCRIPTION OF THE DISCLOSURE

Figure 1:
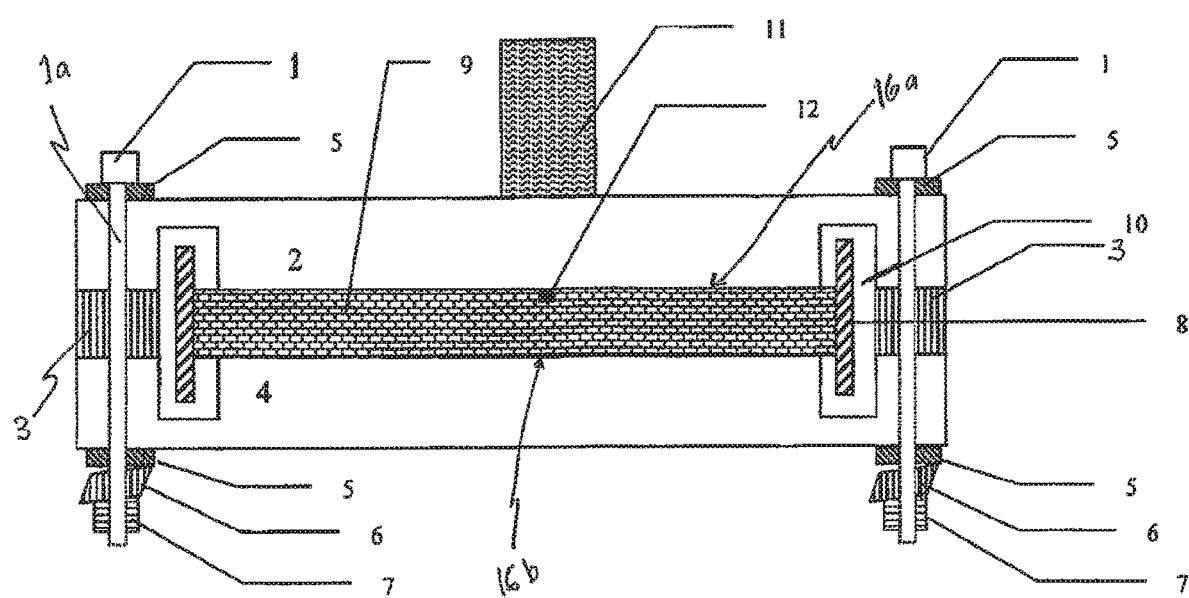
FIG. 1 depicts, in cross section, an embodiment of the assembly of the disclosure employing a gasket, at ambient temperature.

Referring to FIG. 1 in detail, there is illustrated a cross sectional view of one embodiment of the hermetically sealed assembly for precompression of a martinsetic metal that employs a gasket according to the disclosure. The assembly of FIG. 1 is shown at ambient temperature. The assembly comprises first sapphire window 2 and second sapphire window 4 which are spatially situated relative to each other to form a space therebetween within which space is disposed martinsetic metal 9. The sapphire windows 2 and 4 can be of any geometrical shape, e.g., circular, rectangular, square and the like. In one practice the sapphire windows 2 and 4 are circular and are of substantially the same size having substantially the same dimensions, preferably identical in shape and having identical dimensions for the features discussed herein.

In the context of negative pressure energy transfer systems as described, for example, in U.S. Pat. Nos. 5,113,661 and 7,581,403, and in Deeks, D. H., "Entropy Driven Absolute Negative Pressure Systems for the Future of Electric Power," IEEE XPlore 2015, the thinner the thickness of the sapphire windows 2 and 4, the greater the thermal transfer; however, the thinner the sapphire window is, the weaker it becomes, causing the need for a lattice or grill work to be attached to the exterior faces of one or both sapphire windows to strengthen them. The thickness of the sapphire window can also affect the focal point of the cryogenically cooled fused silica micro-lens assembly through which a laser beam passes. This beam is produced by either a standard laser or fused silica fiber coupled laser. The laser beam is used to drive the process by acting on the optical doping material in the martinsetic metal. This optical doping may take the form of a Boron Carbide (dopant) and/or other hard high melting point material, and can comprise one or more targets embedded in the metallic lithium. One or more micro lens assemblies are used to concentrate the laser beam so as to heat the optical dopants to a temperature greater than the boiling point of the pre-compressed martensitic metal but not concentrate the laser beam to a strength sufficient to damage the optical doping (dopant). The laser beam must be adequately focused as it passes through the sapphire window so as not to produce too small a spot size on the doping material, nor can it be of an intensity substantially greater than needed to drive the application, otherwise the cryogenically-cooled fused silica lens assembly could degrade.

Figure 3:
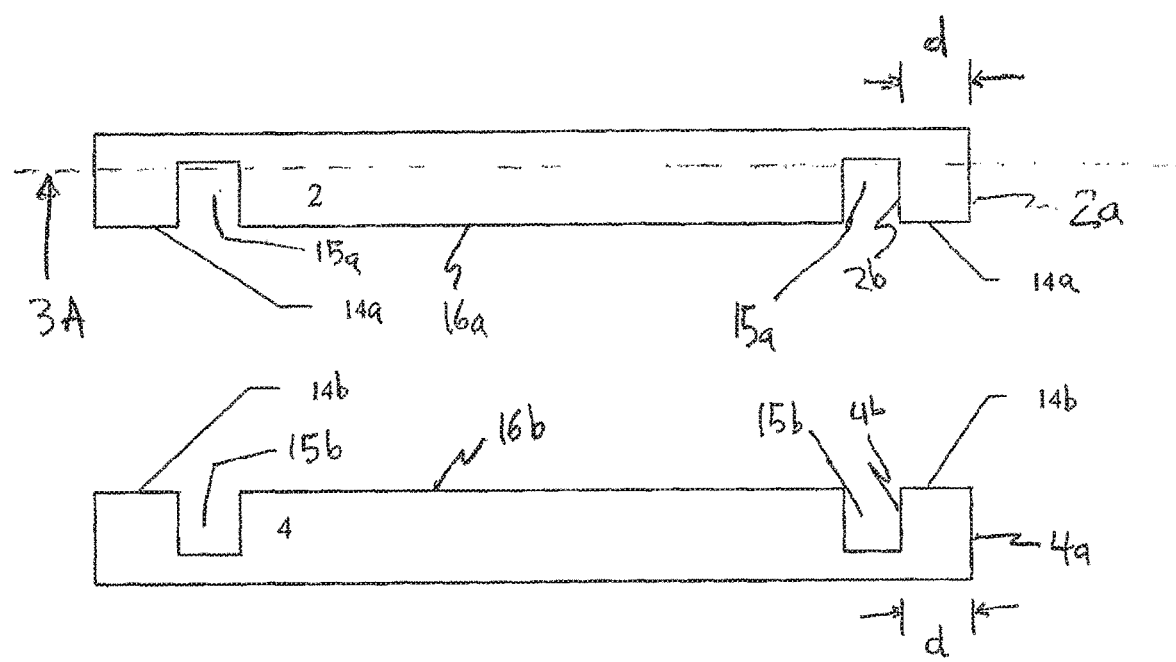
FIG. 3 depicts, in cross section, an embodiment of sapphire windows for an assembly of the disclosure.

With these parameters in mind, as shown in more detail in FIG. 3, the first sapphire window 2 has a groove 15a offset by distance "d" from the outer edge 2a and extending around the periphery of the inside face of the sapphire window, whereas second sapphire window 4 has a groove 15b offset by distance "d" from the outer edge 4a and extending around the periphery of the inside face of the sapphire window. The sapphire windows 2 and 4 are spatially situated to create a space between inner faces 16a and 16b within which the martinsetic metal 9 is disposed. Any martinsetic metal is serviceable for 9, with metal lithium being preferred, including isotopes of martinsetic metals, such as lithium that are alloyed and/or optically doped and/or electronically or magnetically doped.

As shown in FIG. 1, martinsetic metal 9 is in contact with inner faces 16a and 16b of the first and second sapphire windows. Grooves 15a and 15b are configured so that when they are superposed or aligned they define internal channel (or void) 10, which extends outwardly and also preferably orthogonally from the space within which martinsetic metal 9 is disposed to accommodate expansion and contraction of the martinsetic metal as it cycles between ambient temperature (e.g. about 25° C.) and cryogenic temperatures (e.g. about −250°) C. As depicted, internal channel 10 is substantially rectangular in cross section, although other cross sectional shapes may be employed.

Martinsetic metal 9 has a perimeter. Secured to the perimeter and extending around it is containment means 8. The containment means is configured to form a seal between the internal channel 10 and the first and second sapphire windows 2 and 4 when the assembly is at cryogenic temperatures. In one embodiment, the containment means comprises a washer. Materials of construction for the containment means includes, without limitation, stainless steel (e.g. 316 stainless steel), nickel, iron-nickel-cobalt alloys (such as commercially available KOVAR), nickel-iron alloys (such as commercially available INVAR), or combinations thereof. The assembly has means for coupling the first and second sapphire windows and hermetically sealing the internal channel 10 and space within which martinsetic metal 9 is located. Internal channel 10 may be filled with an inert gas such as argon.

In one embodiment, the means coupling the first and second sapphire windows and hermetically sealing the internal channel and martinsetic metal space are located at the periphery of the first and second sapphire windows and comprise a gasket 3 interposed between the first and second sapphire windows, the gasket 3 extending around the periphery of the first and second sapphire windows 2 and 4. The gasket 3 may optionally comprise a contiguous bellows or comprise discrete bellows segments, e.g. the gasket 3 may be contiguously U-shaped in cross section or have can have discrete segments that are U-shaped in cross section. A plurality of fasteners preferably having positive pressure components is used to secure the gasket 3 and the sapphire windows 2 and 4. Positive pressure components include, without limitation, washers, springs, disc springs, wave springs, belleville disc springs, spring washers, and combinations thereof.

The means for coupling depicted in FIG. 1 include bolts 1 (screws and the like may also be employed) extending through holes 1a bored through the first and second sapphire windows 2 and 4 and gasket 3 secured with washers 5, and nuts 7. The positive pressure components depicted in FIG. 1 are wave springs 6. Preferably, gasket 3 has substantially the same coefficient of thermal expansion as the sapphire windows. Serviceable materials of construction for gasket 3 include, without limitation, glass-filled polytetrafluoroethylene (PTFE) (e.g. 25% glass filled PTFE), PTFE, stainless steel, gortex, nickel, iron-nickel-cobalt alloys (such as commercially available KOVAR), nickel-iron alloys (such as commercially available INVAR), or combinations thereof. FIG. 1 further depicts a silica micro lens 11 and a dopant 12.

Figure 2:
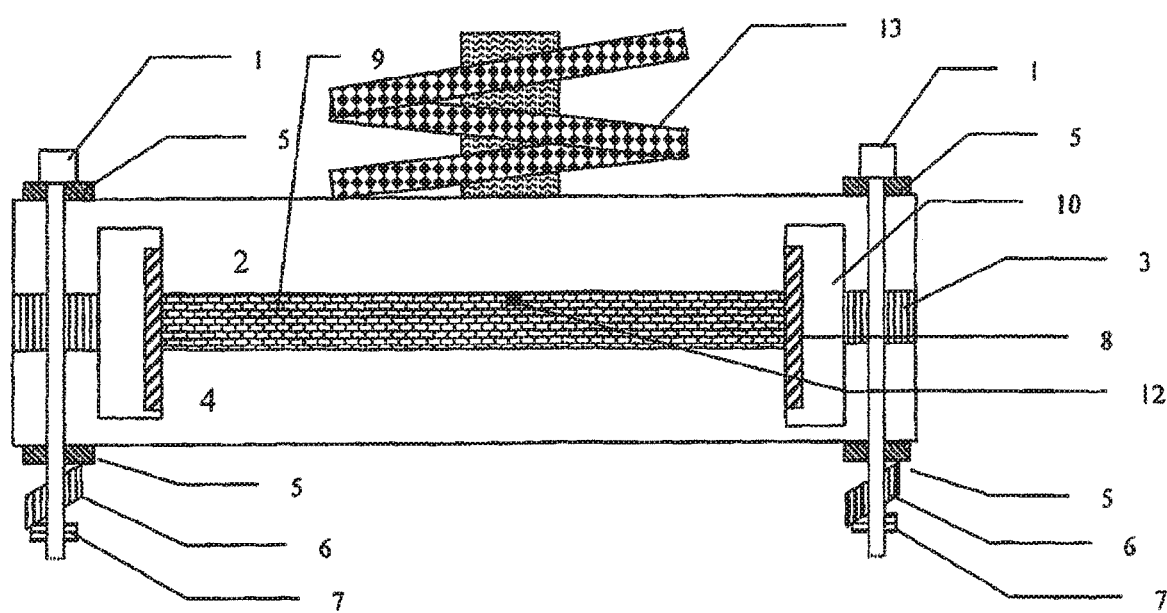
FIG. 2 depicts, in cross section, the embodiment of FIG. 1 at cryogenic temperature.

The assembly of FIG. 1 is shown at ambient temperature. As illustrated, martinsetic material 9 extends into internal channel 10. FIG. 2 depicts the assembly of FIG. 1 at cryogenic temperature. As seen in FIG. 2, martinsetic metal 9 has contracted and a seal has been formed between containment washer 8 and sapphire windows 2 and 4. FIG. 2 also depicts the contraction (narrowing) of the space between sapphire windows 2 and 4 as compared to FIG. 1. Martinsetic metal 9 is maintained in positive pressure contact with the sapphire windows during contraction by wave springs 6 shown in FIG. 2 in a compressed state. Means for compressing and decompressing the first and second sapphire windows while maintaining contact with the martinsetic metal include, without limitation, lock washer 13, which can precisely control the amount of pressure exerted, and also causes the martinsetic metal to maintain positive pressure contact with the sapphire windows.

Figure 3A:
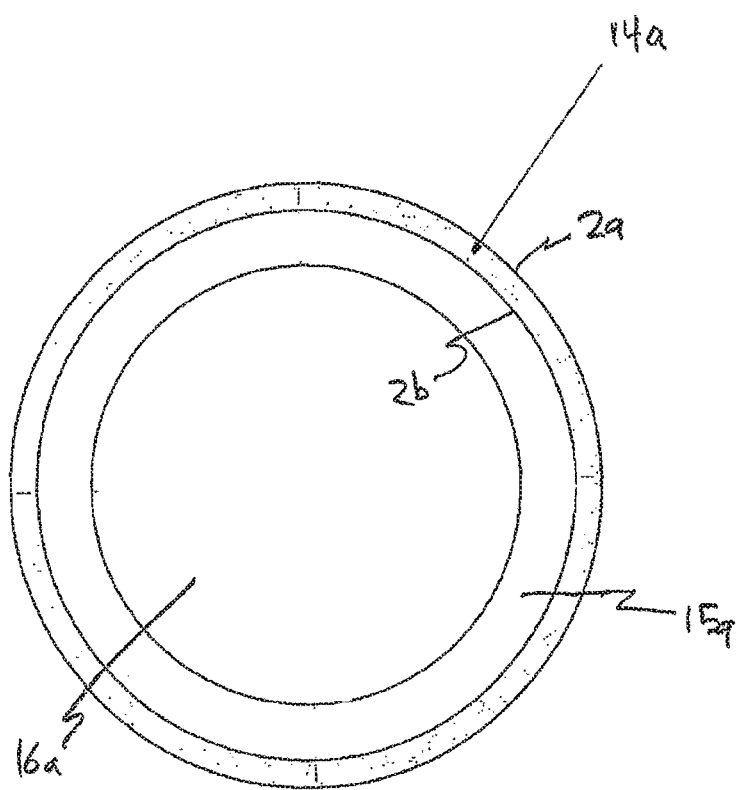
FIG. 3A depicts a plan view of the inner face of a sapphire window of the disclosure having a metalized area.
Figure 4:
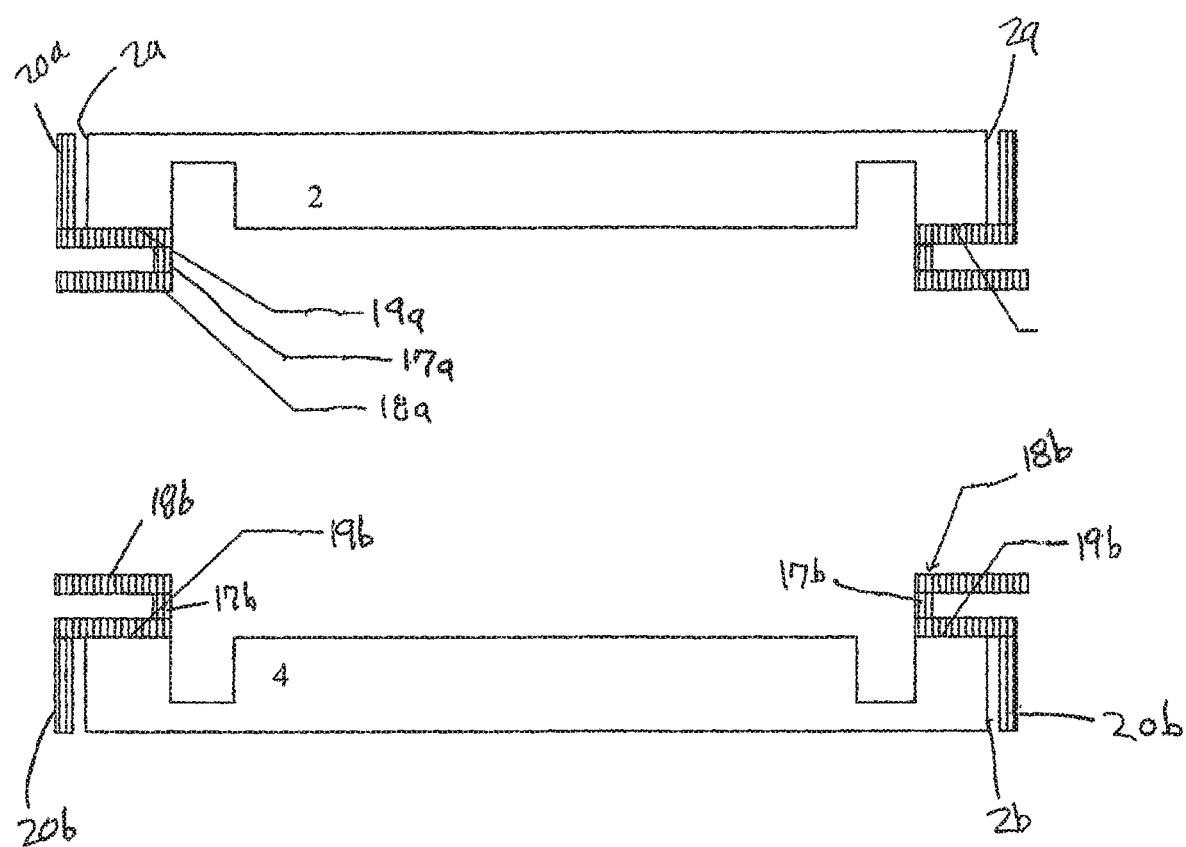
FIG. 4 depicts, in cross section, the sapphire windows of FIG. 3 having metallic seals secured.
Figure 4A:
FIG. 4A depicts, in cross section, an embodiment of a bellows element of the disclosure.
Figure 5:
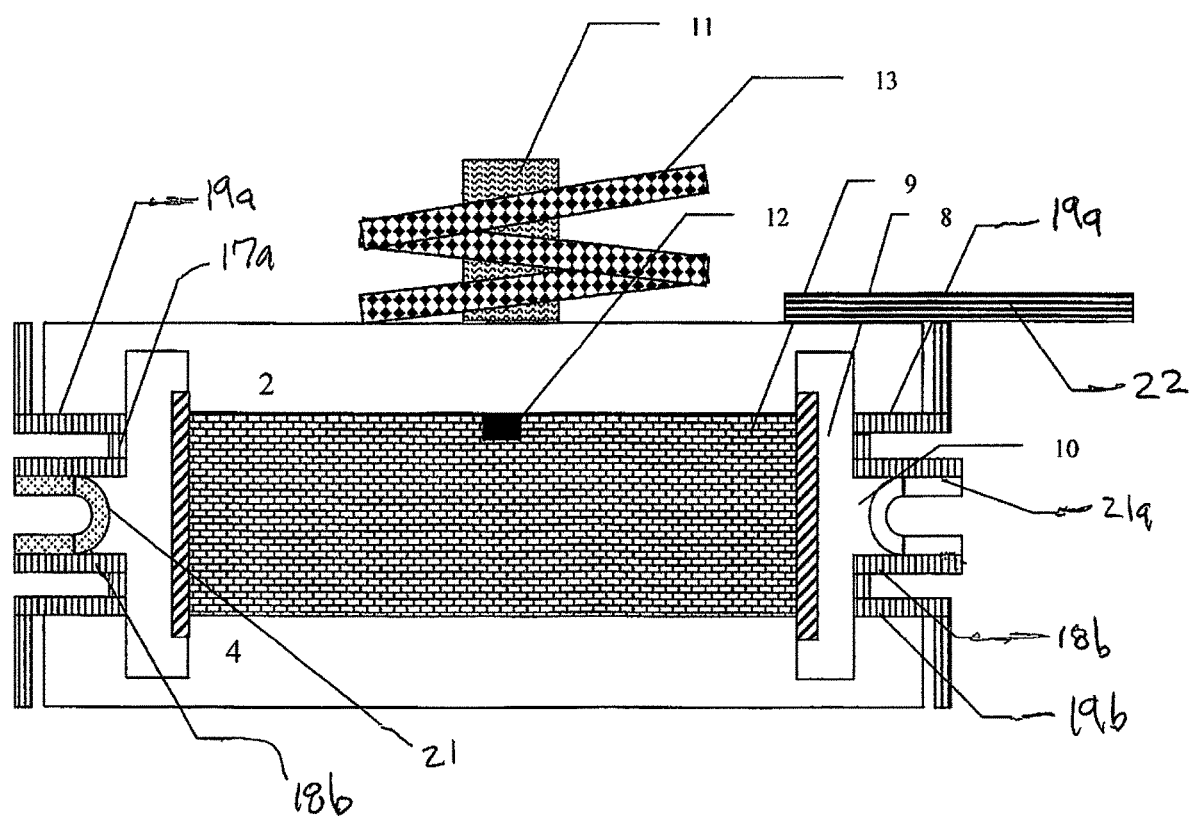
FIG. 5 depicts, in cross section, another embodiment of the disclosure employing a metallic sealing element, at cryogenic temperature.

FIG. 5 depicts the assembly having another embodiment of the means for coupling the first and second sapphire windows and hermetically sealing the internal channel 10 and space within which martinsetic metal 9 is located. In FIG. 5, the means comprises a metallic sealing member interposed between the first and second sapphire windows, and extending around the periphery of the first and second sapphire windows. Referring to FIGS. 3, 3A, 4 and 4A and 5 for this embodiment: in one practice, FIGS. 3 and 3A (FIG. 3A depicts one of the two identical sapphire windows, in particular the upper sapphire window 2 of FIG. 3 along line 3A) illustrate first and second sapphire windows 2 and 4 having grooves 15a and 15b offset from outer edges 2a and 4a respectively. Each of inner peripheral faces, extending from outer edges 2a to 2b, and from 4a to 4b respectively, has, at least for purposes of the embodiment of FIG. 5, metalized areas, 14a and 14b. The metalized areas can be vacuum deposited with one or more metals or metal alloys, such as, without limitation, stainless steel, nickel, iron-nickel-cobalt alloys (such as commercially available KOVAR), nickel-iron alloys (such as commercially available INVAR), or combinations thereof.

As shown in FIG. 4, the metallic sealing member comprises a first metallic seal having opposed sidewalls 18a and 19a separated by spacer 17a. Sidewall 18a is secured to the first sapphire window 2 through metalized area 14a, by brazing or soldering, e.g., silver solder brazing. Similarly, a second metallic seal having sidewalls 18b and 19b separated by spacer 17b is secured to the second sapphire window 4 through metalized area 14b by brazing or soldering. The first and second metallic seals have flanges 20a and 20b, respectively, that surround and protect the outer edges 2a and 2b of the first and second sapphire windows. The metallic seals can either integrally comprise the component sidewalls, space, flange; or these components can be separately provided and connected together by means known in the art, e.g. welding and the like.

Figure 4B:
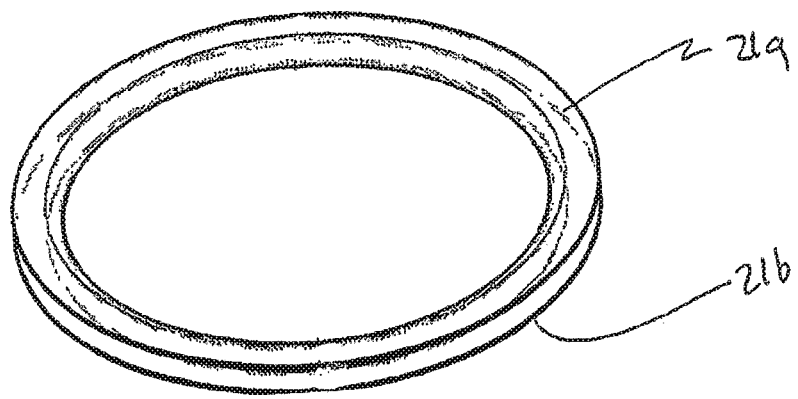
FIG. 4B is a perspective view of the bellows element of FIG. 4A.

FIG. 4A shows bellows element, 21, in cross section, as a ring embodiment, although other configurations for the bellows element consistent with the shape of the sapphire windows can be used. FIG. 4B shows a perspective view of the bellows ring 21 of FIG. 4A. The bellows ring 21 is interposed between and attached to the first and second metallic sealing elements. As depicted in FIG. 5, bellows ring 21 has a substantially U-shaped cross section to permit compression and decompression when the assembly is cycled between ambient temperatures and cryogenic temperatures, and extends around the periphery of the first and second sapphire windows 2 and 4.

In one embodiment, bellows ring 21 has the outer surface of one of the U-shaped sides 21a attached, by brazing or welding or combinations thereof, to sidewall 18a of the first metallic seal. The containment washer 8 containing the metallic lithium 9 or other martensitic metal is then placed into the center of the bellows ring. Next the second metallic seal is aligned with the outer perimeter of the outer circumference of the bellows ring, and then the other outer surface of the U-shaped side 21b is attached, by brazing or welding or combinations thereof, to the sidewall 18b of the second metallic seal. At ambient temperature, the containment washer 8, may, but is not required to form a seal with the sapphire windows 2 and 4 so to confine the martensitic metal at ambient temperatures. An inert gas, such as argon gas, can be used to fill internal channel 10. Silica micro-lens assembly 11 can be fused to the optical fiber of the fiber coupled laser while being cryogenically cooled. In operation, the mitigation or elimination of pressure is achieved by at least one of either lock washer 13, and/or the positive pressure components, e.g. wave springs 6. One or more spring chock pins 22 is used to use to avoid rupture of the lithium while the containment washer 8 is unsealed from the sapphire windows 2 and 4. At ambient temperature, spring chock pin 22 is extended.

Preferably, the bellows ring 21 and the components of the first metallic seal (18a, 17a, 19a 20a) and second metallic seal (18b, 17b, 19b, 20b) all have substantially the same thermal coefficient of expansion. Serviceable materials of construction for the bellows ring and the components of the first and second metallic seals include without limitation, stainless steel, nickel, iron-nickel-cobalt alloys (such as commercially available KOVAR), nickel-iron alloys (such as commercially available INVAR), or combinations thereof.

FIG. 5 depicts the assembly at cryogenic temperature. As seen in FIG. 5, martinsetic metal 9 has contracted and a seal has been formed between containment washer 8 and sapphire windows 2 and 4. U-shaped bellows ring 21 compresses and decompresses sufficiently to maintain positive pressure contact of the martinsetic metal 9 and the sapphire windows 2 and 4 during contraction. Wave spring 13 or other suitable means for compressing and decompressing the first and second sapphire windows can precisely control the pressure exerted.

Referring to FIG. 5, at cryogenic temperature, the metal containment washer 8 forms a seal with the sapphire windows 2 and 4 and confines the martensitic metal 9 within the space. Application of pressure from at least one of lock washer (13), or spring, disc spring, belleville disc spring, wave disc spring, spring washer, wave spring, or combinations thereof, result in a confined martensitic metal 9 subjected to a pressure within plastic point range of the martinsetic metal. Spring chock pin 22 is retracted at cryogenic temperature.

The present assembly provides precise tuning of the positive pressure necessary for the precompression of the martensitic metal without rupture or leakage of the martinsetic metal. The application of this precompression may occur in different stages. The initial precompression used to seal the martensitic metal using the bellows element, for example, is much less than the plastic point of the martensitic metal. However, the application of the necessary precompression for cryogenic applications must be in the range of the plastic point of the martensitic metal. The prior art, e.g., Hori et al., Journal of Japan Institute of Light Metal, Vol. 50, No. 12 (2000), pp. 660-665 "Plastic Workability of Pure Lithium," the contents of which are incorporated herein by reference, discusses the workability of the martinsetic metal lithium, and in particular, the application of plastic point pressure versus the time to rupture (movement of the metal due to the application of this pressure). This rupture must be avoided as the lithium metal would leak out of the containment washer, prior to cooling the application to cryogenic temperatures, and prior to the containment washer contracting against the sapphire widow to seal the lithium. The application of the correct pressure for the precompression to the specific pressure in the plastic point pressure range is thus time critical to the final assembly of the cryogenic application prior to operation. Such plastic point ranges are known in the art, for example, FIG. 8. of Hori et al. specifically shows the applied pressure versus time to rupture for lithium. The precompression of the martensitic metal to the plastic point has to occur during the final stages of assembly and/or cooling and/or just prior to operation of the cryogenic devices. The remaining time to assemble a cryogenic application device after pre-pressurization to the plastic point should be taken based on the time given for a specific pressure based on this graph.

Likewise this pressurization of the martensitic metal to the plastic point range must be removed (depressurized or decompressed) when the cryogenic application is allowed to warm to ambient temperature, or to above a temperature at which the containment washer no longer seals the martinsetic metal against the sapphire windows. This is also time critical, and governed by the same applied pressure versus time to rupture relationship as exemplified, e.g. in Hori;

however this critical time may be somewhat extended due to the heat of reversion of the martensitic crystalline phase change.

In another embodiment the disclosure relates to a method of sealing an assembly for precompression of a martinsetic metal. The method comprises (i) providing an assembly, as e.g. herein described, for precompression of a martinsetic metal the assembly comprising first and second sapphire windows having a space therebetween, and having the martinsetic metal disposed in the space and in contact with the first and second sapphire windows, the first and second sapphire windows configured to define an internal channel around the perimeter of the martinsetic metal, the internal channel extending outwardly from the space and sized to accommodate expansion and contraction of the martinsetic metal within the internal channel; (ii) sealing the first and second windows to each other by means of a gasket interposed between the first and second sapphire windows and extending around the periphery of the first and second sapphire windows; and (iii) securing the first and second sapphire windows to each other by a plurality of fasteners having positive pressure components, the fasteners extending through the first and second sapphire windows and the gasket, wherein the fasteners can comprise, e.g. bolts, screws and combinations thereof, and the positive pressure components comprise washers, springs, disc springs, wave springs, belleville disc springs, spring washers, and combinations thereof. In another embodiment, the assembly of (i) further comprises providing means to relieve pressure from the martinsetic metal to prevent rupture of the martinsetic metal when the martinsetic metal is pressurized; means to relieve pressure in this regard include without limitation one or more rupture pins, for example one or more spring chock pins.

In another embodiment the disclosure relates to a method of sealing an assembly for precompression of a martinsetic metal, the method comprises (i) providing an assembly as herein described for precompression of a martinsetic metal comprising first and second sapphire windows having a space therebetween, and having the martinsetic metal disposed in the space and in contact with the first and second sapphire windows, the first and second sapphire windows configured to define an internal channel around the perimeter of the martinsetic metal, the internal channel extending outwardly from the space and sized to accommodate expansion and contraction of the martinsetic metal within the internal channel; and (ii) sealing the first and second windows to each other by means of a bellows element having a first side secured to a first metallic seal attached to the first sapphire window and a second side secured to a second metallic seal attached to the second sapphire window, wherein, e.g. the first and second sides of the bellows element are secured by brazing or welding or combinations thereof. In another embodiment, the assembly of (i) further comprises providing means to relieve pressure from the martinsetic metal to prevent rupture of the martinsetic metal means to relieve pressure in this regard include without limitation one or more rupture pins, for example one or more spring chock pins.

In another embodiment the disclosure relates to a method of precompres sing a martinsetic metal comprising (i) providing an assembly as herein described for precompression of a martinsetic metal comprising first and second sapphire windows having a space therebetween, and having the martinsetic metal disposed in the space and in contact with the first and second sapphire windows, the first and second sapphire windows configured to define an internal channel around the perimeter of the martinsetic metal, the internal channel extending outwardly from the space and sized to accommodate expansion and contraction of the martinsetic metal within the internal channel, and containment means extending around and secured to the perimeter of the martinsetic metal configured to form a seal between with the internal channel and the first and second sapphire windows at cryogenic temperatures; (ii) sealing the first and second sapphire windows to each other with either of (a) a gasket interposed between the first and second sapphire windows and extending around the periphery of the first and second sapphire windows, and a plurality of fasteners having positive pressure components, the fasteners can comprise e.g. bolts, screws and combinations thereof, and the positive pressure components comprise washers, springs, disc springs, wave springs, belleville disc springs, spring washers, and combinations thereof, the fasteners extending through the first and second sapphire windows and the gasket, or (b) a bellows element having a first side secured to a first metallic seal hermetically attached to the first sapphire window and a second side secured to a second metallic seal hermetically attached to the second sapphire window, e.g. the first and second sides of the bellows element can be secured by brazing or welding or combinations thereof; and (iii) pressurizing the martinsetic metal to within the range of the plastic point of the martinsetic metal without rupturing the martinsetic metal. Such plastic points are known in the art, see e.g. Hori, FIG. 8, cited above, the contents of which are incorporated herein, for lithium. In another embodiment, the pressuring of step (iii) further comprises hermetically sealing the space within which the martinsetic metal is disposed, as well as optionally hermetically sealing the internal channel, with the containment means, e.g. washer 8. For example, the pressurizing of step (iii) can occur: (a) during cooling of the assembly to cryogenic temperature, or (b) when the assembly is at cryogenic temperature, whereupon in either case, the martinsetic metal would contract or commence contracting and the containment means would move to form a hermetic seal against the sapphire windows. The pressurizing may be performed by means of a wave spring 13 in conjunction with the positive pressure components, such as wave spring 6, or the bellows element, for example, having a U-shaped cross section which permits sufficient flex to complement the pressurizing of step (iii). In one embodiment, when the assembly is being cooled to cryogenic temperatures, or when it is already at cryogenic temperatures, the martinsetic metal is sealed within the space by the containment means in an amount of time that is less than the time required to rupture the martinsetic metal as it is pressurized to within the range of the plastic point. In another embodiment, the assembly of (i) further comprises providing means to the assembly relieve pressure from the martinsetic metal in order to prevent rupture of the martinsetic metal as it is pressurized and the hermetically sealed in the space; and the pressurizing of step (iii) further comprises activating this means to relieve pressure, such means including without limitation one or more rupture pins, such as one or more spring chock pins, from the martinsetic metal to prevent rupturing of the martinsetic metal. In one embodiment, the means to relieve pressure are situated external to the assembly and are not part of it; that is, they are separate from the assembly and are configured to impinge on the assembly; in one embodiment, the one or more spring chock pins impinge upon the assembly to provide a scissor lift action to the pressurization mechanism, which action can relieve the pressure. The means for relieving pressure, e.g. the one or more spring chock pins can be manually operated or automatically operated being triggered by temperature and/or pressure values that are preset.

In another embodiment, when the assembly is allowed to warm to temperatures above cryogenic, the hermetic sealing of the martinsetic metal into the space, i.e. the seal that was formed between the containment means and the sapphire windows, begins to break, and de-pressurization of the martinsetic metal before this breaking of the seal occurs is time critical, and takes place within the range of the plastic point of the martinsetic metal.

The foregoing description and the embodiments disclosed are by way of example only and are not limiting to the scope of the invention.

What is claimed is:

1. A hermetically sealed assembly for precompression of a martinsetic metal comprising:
    first and second sapphire windows having a space therebetween;
    a martinsetic metal disposed in the space and in contact with the first and second sapphire windows, the first and second sapphire windows configured to define an internal channel around the perimeter of the martinsetic metal, the internal channel extending outwardly from the space and sized to permit expansion and contraction of the martinsetic metal within the internal channel;
    means for coupling the first and second sapphire windows and hermetically sealing the space and the internal channel and
    containment means extending around and secured to the perimeter of the martinsetic metal, wherein the containment means is configured to form a seal between with the internal channel and the first and second sapphire windows at cryogenic temperatures.

2. The assembly of claim 1 wherein the containment means is a washer.

3. The assembly of claim 2 wherein the washer is comprised of stainless steel, nickel, iron-nickel-cobalt alloys, nickel-iron alloys, or combinations thereof.

4. The assembly of claim 1 wherein the means for coupling the first and second sapphire windows and hermetically sealing the space are located at the periphery of the first and second sapphire windows.

5. The assembly of claim 4 wherein the means for coupling the first and second sapphire windows and hermetically sealing the space comprises a gasket interposed between the first and second sapphire windows and extending around the periphery of the first and second sapphire windows, and a plurality of fasteners to secure the gasket and the first and second sapphire windows.

6. The assembly of claim 5 wherein the fasteners comprise positive pressure components.

7. The assembly of claim 6 wherein the positive pressure components are selected from the group consisting of washers, springs, disc springs, wave springs, belleville disc springs, spring washers, and combinations thereof.

8. The assembly of claim 5 wherein the gasket has substantially the same coefficient of thermal expansion as the sapphire windows.

9. The assembly of claim 8 wherein the gasket is comprised of glass-filled PTFE, PTFE, stainless steel, gortex, nickel, iron-nickel-cobalt alloys, nickel-iron alloys, or combinations thereof.

10. The assembly of claim 4 wherein the means for coupling the first and second sapphire windows and hermetically sealing the space comprises a metallic sealing member interposed between the first and second sapphire windows, and extending around the periphery of the first and second sapphire windows.

11. The assembly of claim 10 wherein the metallic sealing member comprises a first metallic seal, the first metallic seal being secured to the first sapphire window; a second metallic seal, the second metallic seal being secured to the second sapphire window; and a bellows element interposed between, and attached to, the first and second metallic sealing elements.

12. The assembly of claim 11 wherein the first metallic seal is secured to the first sapphire window by brazing or soldering to a metalized area on the first sapphire window, and the second metallic seal is secured to the second sapphire window by brazing or soldering to a metalized area on the second sapphire window.

13. The assembly of claim 11 wherein the bellows element is a ring and has a substantially U-shaped cross section, and is attached to the first and second sealing elements by brazing or welding or combinations thereof.

14. The assembly of claim 11 wherein the first metallic seal, the second metallic seal, and the bellows element have substantially the same thermal coefficient of expansion.

15. The assembly of claim 14 wherein the first metallic seal, the second metallic seal, and the bellows element are each independently comprised of stainless steel, nickel, iron-nickel-cobalt alloys, nickel-iron alloys, or combinations thereof.

16. The assembly of claim 1 further comprising means for compressing and decompressing the first and second sapphire windows while maintaining contact with the martinsetic metal.

17. The assembly of claim 16 wherein the means for compressing and decompressing is located on the outside surface of the first sapphire window, the second sapphire window, or both.

18. The assembly of claim 17 wherein the means for compressing and decompressing is selected from the group consisting of washers, springs, disc springs, wave springs, belleville disc springs, spring washers, and combinations thereof.

19. The assembly of claim 1 further comprising a micro lens located on the outside surface of the first sapphire window, the second sapphire window, or both.

20. The assembly of claim 1 wherein the martinsetic metal is lithium.

21. The assembly of claim 20 wherein the lithium comprises a dopant.

22. A method of sealing an assembly for precompression of a martinsetic metal comprising:
    (i) providing an assembly for precompression of a martinsetic metal comprising first and second sapphire windows having a space therebetween, and having the martinsetic metal disposed in the space and in contact with the first and second sapphire windows, the first and second sapphire windows configured to define an internal channel around the perimeter of the martinsetic metal, the internal channel extending outwardly from the space and sized to accommodate expansion and contraction of the martinsetic metal within the internal channel;
    (ii) sealing the first and second windows to each other by means of a gasket interposed between the first and second sapphire windows and extending around the periphery of the first and second sapphire windows; and
    (iii) securing the first and second sapphire windows to each other by a plurality of fasteners having positive pressure components, the fasteners extending through the first and second sapphire windows and the gasket, wherein (i) comprises providing to the assembly means to relieve pressure from the martinsetic metal in order to prevent rupture of the martinsetic metal, and wherein the means to relieve pressure comprises one or more spring chock pins.

23. The method of claim 22 wherein the fasteners comprises bolts, screws and combinations thereof, and the positive pressure components comprise washers, springs, disc springs, wave springs, belleville disc springs, spring washers, and combinations thereof.

24. A method of sealing an assembly for precompression of a martinsetic metal comprising:
(i) providing an assembly for precompression of a martinsetic metal comprising first and second sapphire windows having a space therebetween, and having the martinsetic metal disposed in the space and in contact with the first and second sapphire windows, the first and second sapphire windows configured to define an internal channel around the perimeter of the martinsetic metal, the internal channel extending outwardly from the space and sized to accommodate expansion and contraction of the martinsetic metal within the internal channel; and
(ii) sealing the first and second windows to each other by means of a bellows element having a first side secured to a first metallic seal attached to the first sapphire window and a second side secured to a second metallic seal attached to the second sapphire window.

25. The method of claim 24 wherein the first and second sides of the bellows element are secured by brazing or welding or combinations thereof.

26. The method of claim 24 wherein (i) further comprises providing to the assembly means to relieve pressure from the martinsetic metal in order to prevent rupture of the martinsetic metal.

27. The method of claim 26 wherein the means to relieve pressure comprises one or more spring chock pins.

28. A method of precompressing a martinsetic metal comprising:
(i) providing an assembly for precompression of a martinsetic metal comprising first and second sapphire windows having a space therebetween, and having the martinsetic metal disposed in the space and in contact with the first and second sapphire windows, the first and second sapphire windows configured to define an internal channel around the perimeter of the martinsetic metal, the internal channel extending outwardly from the space and sized to accommodate expansion and contraction of the martinsetic metal within the internal channel, and containment means extending around and secured to the perimeter of the martinsetic metal configured to form a seal between with the internal channel and the first and second sapphire windows at cryogenic temperatures;
(ii) sealing the first and second sapphire windows to each other with (a) a gasket interposed between the first and second sapphire windows and extending around the periphery of the first and second sapphire windows, and a plurality of fasteners having positive pressure components, the fasteners extending through the first and second sapphire windows and the gasket, or (b) a bellows element having a first side secured to a first metallic seal hermetically attached to the first sapphire window and a second side secured to a second metallic seal hermetically attached to the second sapphire window; and
(iii) pressurizing the martinsetic metal to within the range of the plastic point of the martinsetic metal without rupturing the martinsetic metal.

29. The method of claim 28 wherein the pressuring of step (iii) further comprises sealing the space within which the martinsetic metal is disposed with the containment means.

30. The method of claim 29 wherein the pressurizing of step (iii) occurs: (a) during cooling of the assembly to cryogenic temperature, or (b) when the assembly is already at cryogenic temperature.

31. The method of claim 30 further comprising, after step (iii):
(iv) depressuring the martinsetic metal within the range of the plastic point of the martinsetic metal without rupturing the martinsetic metal.

32. The method of claim 31 wherein the depressurizing of (iv) occurs at a temperature above cryogenic temperature.

33. The method of claim 28 wherein (i) further comprises providing to the assembly means for relieving pressure from the martinsetic metal to prevent rupture of the martinsetic metal.

34. The method of claim 33 wherein the pressurizing of step (iii) further comprises activating the means to relieve pressure from the martinsetic metal in order to prevent rupturing of the martinsetic metal.

35. The method of claim 33 wherein the means to relieve pressure comprises one or more spring chock pins.

36. The method of claim 28 wherein in (ii)(a) the fasteners comprise bolts, screws and combinations thereof, and the positive pressure components comprise washers, springs, disc springs, wave springs, belleville disc springs, spring washers, and combinations thereof; and wherein in (ii)(b) the first and second sides of the bellows element are secured by brazing or welding or combinations thereof.

37. The method of claim 28 wherein the first and second sides of the bellows element are secured by brazing or welding or combinations thereof.

* * * * *